June 3, 1947.　　J. E. CANDLIN, JR., ET AL　　2,421,680
VEHICLE LIGHTING SYSTEM
Filed July 13, 1944　　3 Sheets-Sheet 3

Inventors:
James E. Candlin, Jr.
Harry L. Howe
By Oscar Hochberg
Their Attorney.

Patented June 3, 1947

2,421,680

UNITED STATES PATENT OFFICE 2,421,680

VEHICLE LIGHTING SYSTEM

James E. Candlin, Jr., Chicago, and Harry L. Howe, Riverdale, Ill., assignors to Pullman-Standard Car Manufacturing Company, Chicago, Ill., a corporation of Delaware Application July 13, 1944, Serial No. 544,657

11 Claims. (Cl. 240—7.1)

This invention relates to a lighting arrangement for vehicles having a plurality of seats and has for its principal object the provision of lighting fixtures individual to the respective seats.

An important object of the invention is the provision of a lighting fixture which is retractible and adapted to be turned on and off by the actuation of the fixture from retracted to extended positions and return.

A primary object of the invention is the provision of a retractible lighting fixture adapted to be embedded in a seat and which is movable from a retracted position flush with the surface of the seat, to an extended position, lighting the individual zone of the seat.

Another object of the invention is the provision of a retractible lighting fixture for mounting in a seat, and which is upholstered to conform with the seat when retracted, and which may be extended to expose a lens adapted to project light into the reading zone.

A further object of the invention is the provision of a retractible lighting fixture which is provided with ventilating means adapted to circulate air through the lamp housing in the extended position of the fixture.

A still further object of the invention is to provide a retractible lighting fixture for mounting flush within a seat and having spring means adapted to retain the fixture either in retracted or extended positions.

The foregoing and other objects are attained by the arrangement illustrated in the accompanying drawings, in which—

Figure 1:
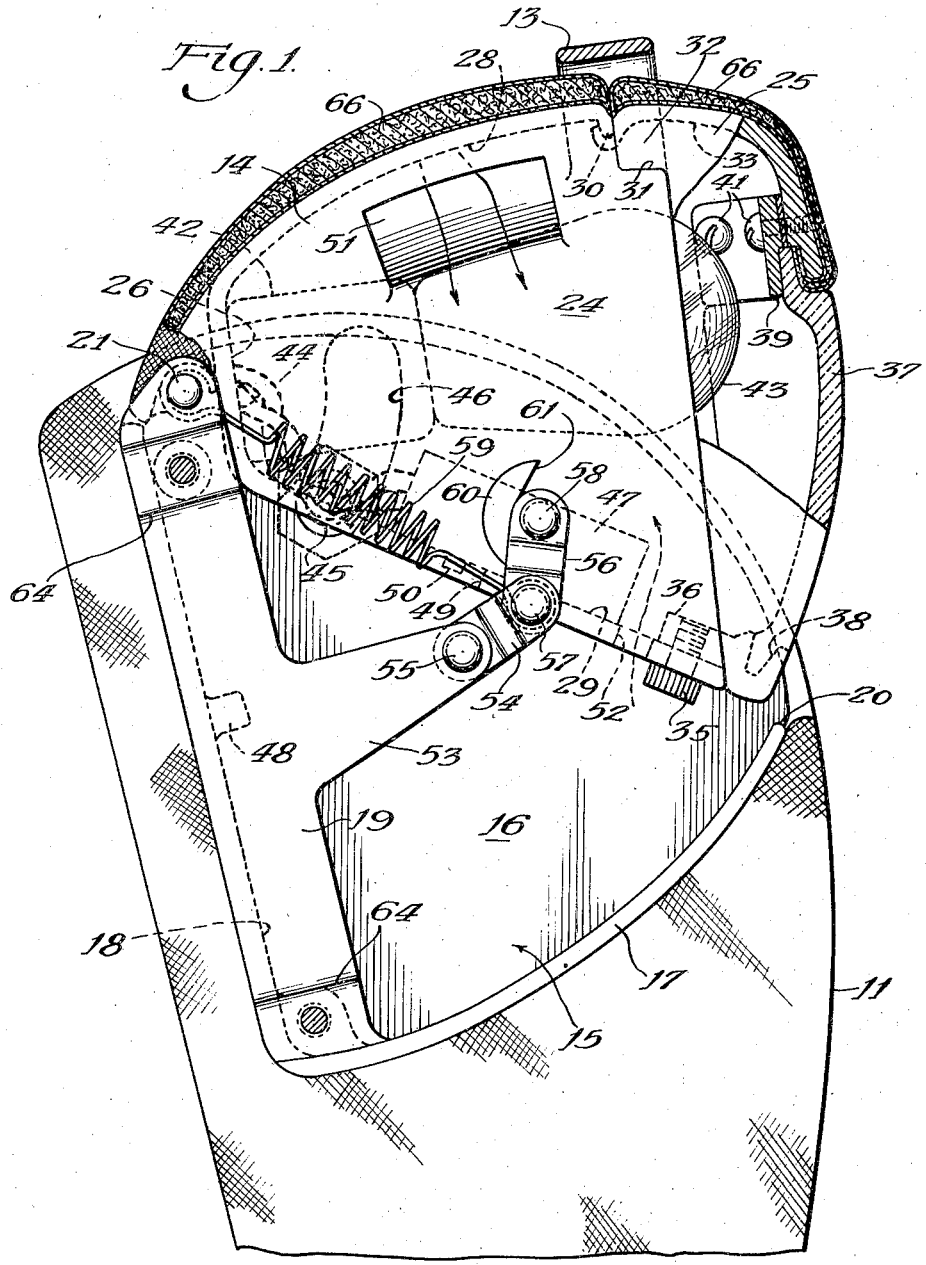
Figure 2:
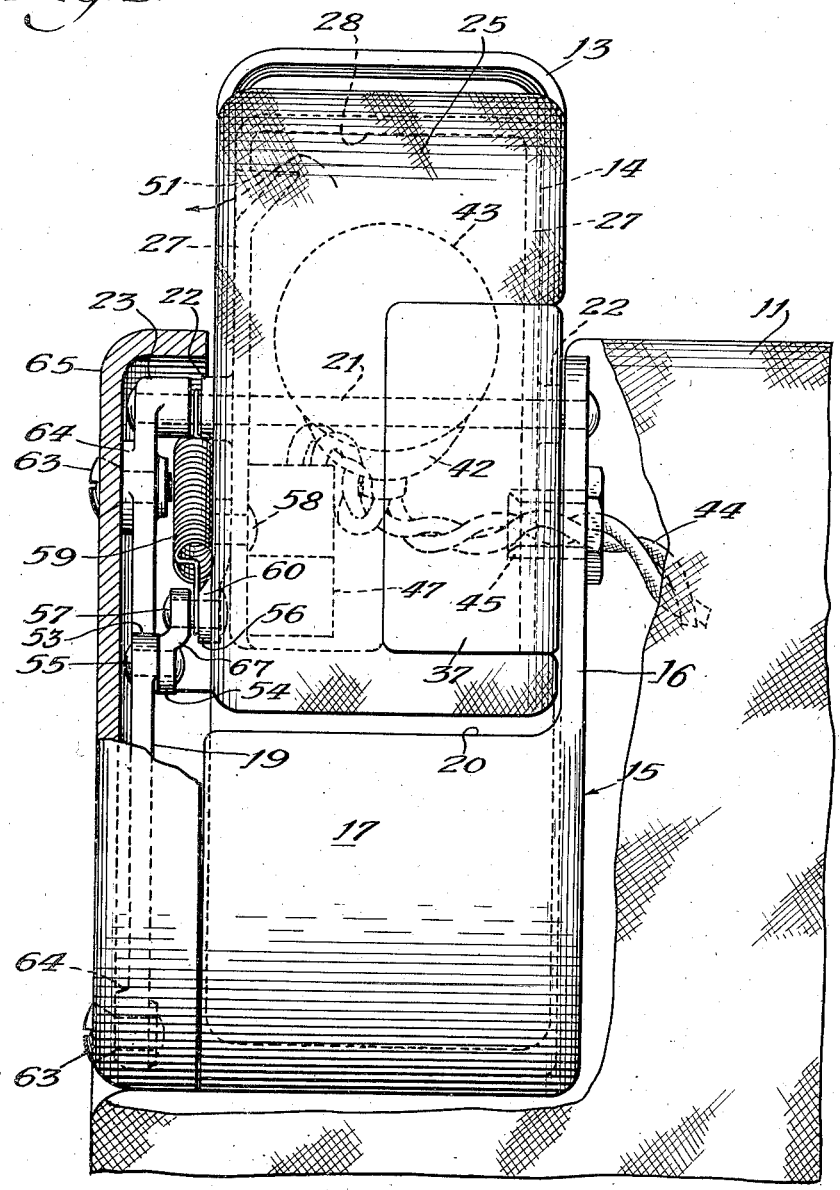
Figure 3:
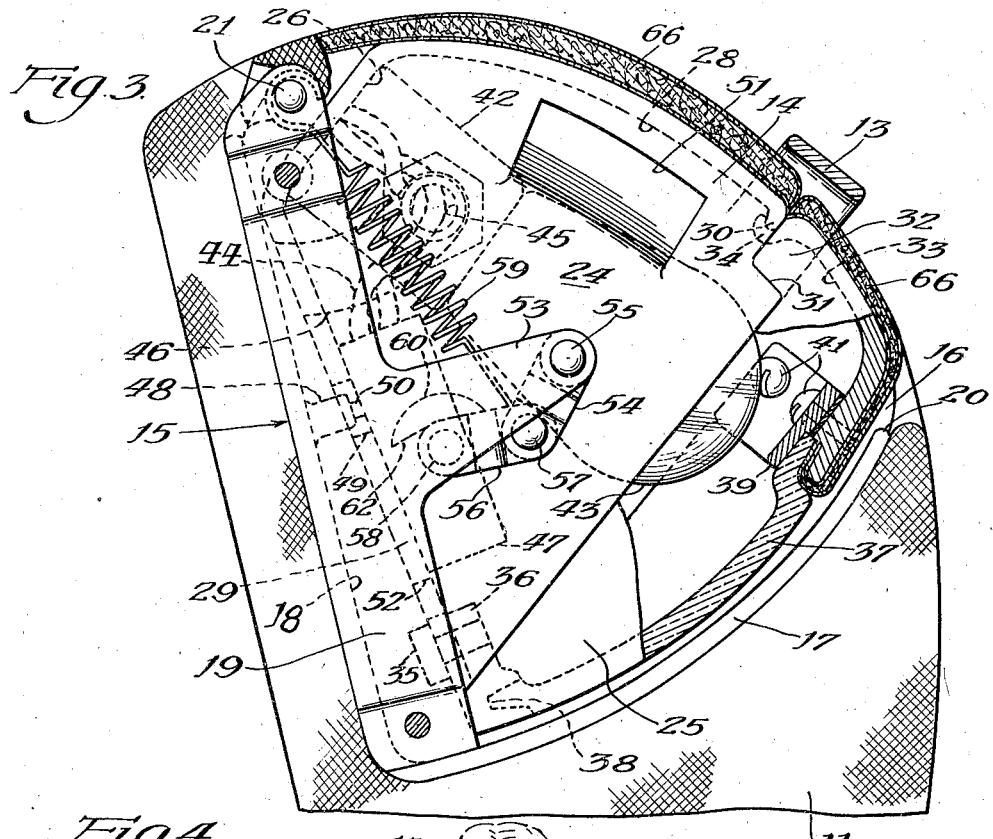

Fig. 1 is a generally side elevational view of the lighting fixture applied to a seat, which is indicated in section and showing the lamp housing in extended position, with the lens exposed, above the surface of the seat. The bracket in which the housing is pivotally mounted is shown with the side cover plate removed to reveal the tension spring and toggle link arrangement for controlling movement of the lamp housing as the mechanism appears in the fully open position of the housing, at which time the links, by means of the spring tension, exert a force maintaining the housing in fully open position. Portions of the lamp housing and lens are shown in section and the upholstery covering the housing is shown removed from the near side, better to reveal the outlet opening for circulating ventilating air through the housing;

Fig. 2 is a generally front elevational view of the lighting fixture as applied at the uppermost corner of a seat with the upholstering material of the seat broken away to reveal the mounting bracket for the lamp housing, which is shown in the raised or extended position, with the lens adapted to direct light rays to one side in the direction of the reading zone of the seat upon which the fixture is mounted. The side cover plate protecting the spring and toggle link control mechanism is shown partially broken away to reveal the relation of these parts;

Fig. 3 is a view similar to Fig. 1, showing the lighting fixture in generally side elevation, but illustrating the lamp housing in its retracted position, flush with the surface of the seat with the handle for operating the housing extending above such surface in position to be grasped to withdraw the lamp housing from its enclosure. The tension spring and toggle link mechanism for controlling the movements of the lamp housing is shown as disposed in the final position of closing, at which time the links, by means of the spring tension, exert a force to maintain the housing in fully closed position; and Fig. 4 is a general perspective view of a pair of adjoining seats each equipped with a retractable lighting fixture of the type illustrated in Figs. 1 to 3, and showing the fixture on one seat in retracted position, with the lamp housing flush with the surface of the seat, and only the operating handle projecting, while on the adjoining seat, the fixture is illustrated with the lamp housing extended above the surface of the seat, in position for the lens to direct light rays into the reading zone of an occupant using the seat.

The lighting fixture of this invention is designed for mounting in seats of the type used in vehicles for public transportation, and, more particularly, coach seats, which may be disposed in pairs having individually adjustable and reclining backs; and, is intended to provide a system of illumination for vehicles of this type, which is at the control of the individual passengers and which provides a source of light for each passenger, adapted to furnish light in the reading zone without disturbing persons in the adjoining area. The fixture is retractable to provide a flush surface to the seat when the light is not necessary, and is automatically turned on and off by the movement of the fixture between the two positions of use and non-use.

Figure 4:
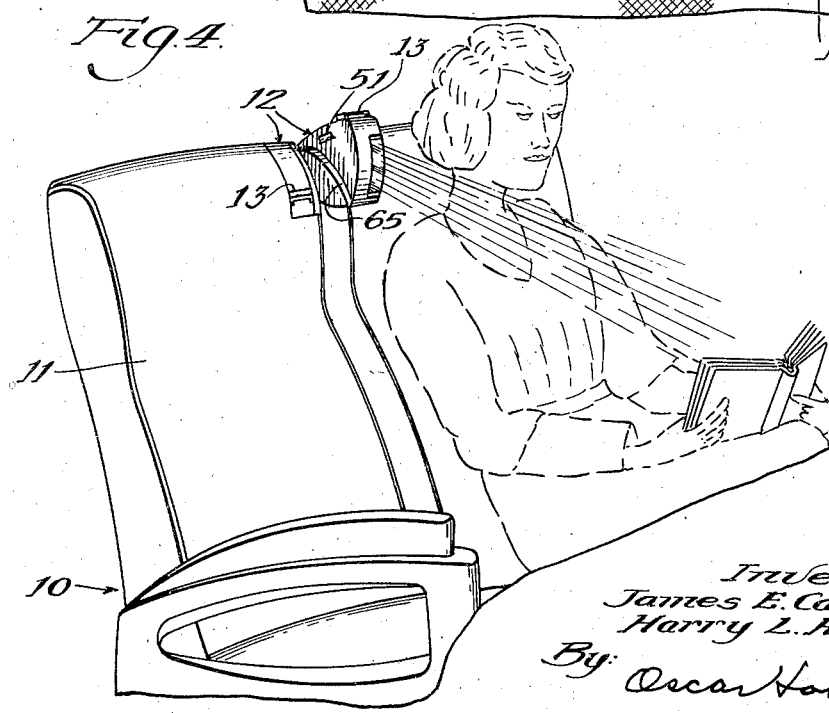

In the drawings, 10 represents a vehicle seat which, as best shown in Fig. 4, is provided with backrest 11 and is arranged in pairs to provide adjoining seats. The backrests 11 are individually adjustable to a plurality of reclining positions, in addition to the normally upright position illustrated. The usual disposition of the seats in a vehicle is in longitudinally spaced pairs upon opposite sides of a central aisle, extending the length of the seating area. The seats may be of the reversible type, rotatable upon a pedestal to face in either direction of the vehicle, or of a fixed type to face only in one direction. The seats are constructed with surface contours adapted to conform to, and afford the most comfortable support for the occupants in the various positions to which the backrests are adjustable. A lighting fixture 12 is provided for each seat, mounted in a recess in the backrest 11 and shaped to the surface contours thereof, and disposed flush therewith in the normal inoperative position of the fixture, as illustrated upon the nearest seat in this figure, which represents the retracted condition of the light, and on the other seat, the lighting fixture is shown projected above the surface of the seat to direct light rays into the reading zone of the occupant, and which represents the extended operative position of the light. The light is manipulated between the two positions by means of handle 13 and is turned on and off automatically when thus operated.

The lighting fixture 12 comprises a lamp housing 14 pivotally mounted in a bracket 15 embedded in a recess in the backrest 11 and secured to the seat frame. The bracket 15 may be mounted at either of the upper corners of the backrest, right or left, and may be so arranged in the respective seats of each pair as to have the fixtures disposed to direct light over the shoulders of the respective occupants of the seats from corresponding directions, or the two fixtures on adjoining seats may be disposed as shown in Fig. 4 to direct light into the reading zones of the respective passengers from a position between them at the adjoining sides of the two seats. The bracket 15, secured to the seat, has an extended inner side wall 16, an arcuate bottom wall 17, a rear wall 18 and at the outer side is provided with a wall 19. The three sides of the bracket formed by walls 16, 17 and 18 are fully closed and the wall 19 is only of such extent as to leave the outer side of the bracket open over a substantial portion of this area so that a pocket is provided for reception of the lamp housing 14 and which, being mounted directly at the top and side of the seat, affords a receptacle at the uppermost corner of the seat, open exteriorly, but closing the unit off at the inner side from the structure of the seat. The upholstering materials of the seat engage directly against the three closed walls of the bracket and the wall 16, at its free edge, is shaped substantially to the surface contour of the backrest, while the forward edge 20 of bottom wall 17 is disposed adjacent to the surface of the backrest, as best shown in Figs. 1 and 3.

The lamp housing 14 is mounted in the bracket between the side walls 16 and 19 and is adapted to pivot about a pin 21 extending between and secured in the two side walls and passing through the housing 14 which is provided with bosses 22 at the opposite sides thereof to afford greater bearing area on the pivot pin and serving to center the housing between the side walls. An inwardly extending boss 23 is provided on the outer wall 19 to afford increased bearing area for support of the pin 21. The housing 14 is constructed in two parts comprising a body portion 24 and a removable cover 25. The body portion is somewhat boxlike in form, having a rear base wall 26, parallel side walls 27 and divergent upper and lower walls 28 and 29, respectively. The upper wall 28 is curved and conforms to the surface contour of the backrest 11 as best shown in Fig. 3, and is formed with an overhanging lip 30 with which the cover 25 is adapted to interlock as presently will appear. It will be noted that the upper wall 28 of the housing terminates within the area of the overlying handle 13, whereby the joint between the housing and the cover 25 is concealed. The side walls 27 of the housing terminate flush with the forward edge of operating handle 13 and are adapted for abutting relation with the cover 25.

The cover, cooperating with the body portion to provide a fully enclosed lamp housing, is removably secured for maintenance and servicing of the fixture. The cover is shaped to conform with that of the body portion 24, and is of such size as to fit within the curved bottom wall 17 of the mounting bracket 15, when the lamp is disposed in retracted position. The side walls 27 of the body portion 24 are stepped as at 31, and the cover 25 is provided with an extended upper portion 32, adapted to interfit with the stepped out portion 31, and including an upper wall 33 in abutting relation to the cut-back upper wall 28 of the body portion 24. The upper wall of the cover is provided with a projecting extension 34, having a laterally disposed groove in its upper face adapted to interlock with the depending lip 30 on the upper wall 28 of the body portion, and this interlock in combination with the stepped interfitting relation between the side walls of the two members serves to maintain a proper fixed relation of the parts. The cover is secured by means of a knurled thumb screw 35, entered through the bottom wall 29 of the body portion and threaded into a flange 36 on the cover, which extends within the body portion 24, in close proximity to the bottom wall 29. A lens 37 is supported in the cover 25 and, as best shown in Figs. 2 and 4, is disposed at one side of the lamp housing to direct the light rays emanating from the fixture in the desired direction into the reading zone of the occupant of the seat. The lens is supported in a groove 38 at the bottom of the cover 25 and secured in place at the top by means of a clamping plate 39 disposed on the inner side of the cover and removably attached by means of screws 41 which draw the plate against the inside surface of the cover with the lens therebetween.

An electrical socket 42 is mounted upon the base wall 26 of the lamp housing for the reception of an electric bulb 43 by means of which the fixture is lighted. Wiring 44 enters the lamp housing to provide current for the bulb 43 from a source on the vehicle. The wiring enters the body portion 24 through a sleeve member 45 mounted in the side wall 16 of the mounting bracket 15. The sleeve is provided with a hexagonal head and screw threaded for securement in the wall of the mounting bracket in a fixed position, and extends into the body portion of the lamp housing through adjacent side wall 27. An arcuate slot 46 in the side wall 27 of the lamp housing permits the necessary movement of the lighting fixture, relative to the fixed sleeve for movement between retracted and extended position, and to accommodate the full movement of the fixture, the bottom wall 29 is cut away to pass the projecting sleeve 45 with sufficient clearance for the wires 44, whereby the lamp housing may be extended to fully open position without the open slot 46 appearing above the level of the seat backrest 11. One of the wires 44 entering the lamp housing passes directly to an automatically actuated switch 47 for turning the bulb on and off, and the other wire passes through the socket 42 and thence to switch 47 whereby to place the lamp and switch in circuit with a source of current. The switch 47 is mounted on the bottom wall 29 of the lamp housing and is operated by means of a finger 48 projecting from the rear wall 18 of the mounting bracket and adapted to enter an opening 49 in the bottom wall 29 to contact a switch opening plunger 50 as the lamp housing 14 is retracted, and thereby turn off the light. When the fixture is withdrawn to extended position, the plunger 50 is automatically released to cause the switch to complete the circuit to the lamp 43.

The lamp housing 14, as best shown in Fig. 1, is provided with a ventilating system affording a definite circulation of air for carrying away the heat generated by the lamp bulb 43. A side wall 27 of the lamp housing is provided with an opening 51 affording an outlet through which heated air may escape from the housing as cooler fresh air is drawn in through an opening 52 in the bottom wall 29, by the natural circulation created as a result of the heat of the light bulb. As indicated by the arrows in this figure, air enters the space between the lower edge of the cover 25 and the forward edge 20 of the mounting bracket, thence entering the lamp housing through opening 52, passing over the lamp 43 and out through the exhaust opening 51. This natural circulation of air is induced immediately upon extending the light fixture to open position, at which time the opening 51 is exposed above the level of the backrest and the admission opening created between the fixture and the mounting bracket at the position of the flange edge 20.

The lighting fixture is movable between the extended operative position indicated in Fig. 1 and the retracted inoperative position illustrated in Fig. 3, in both of which positions it is maintained by tension spring mechanism adapted alternately to urge the fixture in either direction. The mechanism for controlling the movements of the lamp housing is operative between the mounting bracket 15 and the housing and comprises a tension spring in combination with a pair of connected links secured respectively to the lamp housing and mounting bracket. The side wall 19 of the mounting bracket is provided with an integral arm portion 53, projecting therefrom and to which a link 54 is pivotally secured by means of a pin 55, for movement thereabout as an anchor point. The link 54 is pivotally connected to a second link 56 by means of a pin 57, and it will be noted that this pin is of such length as to provide sufficient space between the adjoining faces of the connected links to accommodate a spring connection presently to be described. The link 56 is pivotally connected to side wall 27 of the lamp housing by means of pin 58 to complete the connection between the lamp housing and mounting bracket. A coil spring 59 is connected to the pin 57 between the opposing faces of the links 54 and 56 and is anchored between the bearing bosses 22 and 23 to the pin 21 upon which the lamp housing 14 is pivoted. The spring exerts a force in tension upon the connected links to maintain the lamp housing in either extreme position, dependent upon the disposition of the links to one side or the other of the pivot 55.

The capacity of the links 54 and 56 in combination with the tension spring 59 to impart a force in either direction of movement of the light fixture, is had by reason of the disposition of the links at an obtuse angle to each other in either extreme position of the fixture with the vertex disposed in the direction away from that of the force exerted by the spring. The disposition of the connected links in relation to the movement of the light fixture is such that the links never assume an aligned relationship on dead center when extended, and thus are prevented from acting as a strut to resist closing of the fixture. Assuming the device to be in the open position shown in Fig. 1, and it is desired to retract the lamp housing, the operation of the mechanism will be as follows: The link 54 pivots about the fixed pivot point 55, while the link 56 pivots about the pin 57, as this pivot point moves through an orbit about the pivot 55. The link 56 being pivotally connected to the lamp housing, it will be seen that the first half of the retracting movement of the housing will be against the tension exerted by spring 59, but after the links assume dead center in overlapping position, the tension of the spring causes the links to move to the position illustrated in Fig. 3, thus drawing the lamp housing to fully retracted position, where it is maintained by the force of the spring. It will be seen that during this movement the links 54 and 56 pass each other, and, in order that sufficient space might be provided for the spring 59 to pass therebetween, each link is offset as at 67, whereby the links may rotate about the pivot pin 57, one passing the other through dead center without interfering with the functioning of spring 59.

The functioning of the mechanism in the opening movement of the lamp housing is exactly the same as in the closing movement just described, but operating in the opposite direction, with the spring 59 resisting the initial movement of the housing, but assisting the final movement thereof. It is this function of the spring and link mechanism of resisting initial movements and assisting final movements of the lamp housing in either direction, which enables the arrangement to maintain the fixture either in fully extended or fully retracted positions. This function is assured by the angular disposition of the connected link members 54 and 56 as above described, since each link during the movement of the lamp housing between extreme opposite positions moves less than one hundred eighty degrees and never assumes a relative straight line position to act as a strut between the mounting bracket and the housing to prevent operation of the latter. The degree of movement or rotation of the links is determined by a stop member 60 located upon the side wall 27 of the lamp housing in close proximity to the link 56 and extending beyond the pivot 58 in opposite directions. Stop surface 61 disposed to one side of the pivot limits the closing movement of the housing 14 by contact with the link 56 when the desired degree of movement is reached, as best shown in Fig. 3, and stop surface 62 disposed to the other side of pivot 58 limits the opening movement of the lamp housing by contact with the other side of this same link at the desired position of angularity as it is rotated in the opposite direction by the movement of the housing, as shown in Fig. 1. Thus it will be seen that by controlling the degree of movement of the link mechanism the limits of movement of the light fixture between extreme opposite positions are positively fixed.

The mounting bracket 15 being open over a substantial portion of the side 19 permits access to the thumb screw 35 for removing the cover 25 with the lens 37 and also leaves the tension spring and link mechanism readily accessible, but this mechanism is concealed by means of a removable plate 65, which covers this entire side and is flanged around the bracket side wall 19 to provide a complete closure for this side of the fixture. The enclosing flange of the cover plate is shaped to correspond to and is disposed flush with the surface contours of the lamp housing in the closed position and to the mounting bracket and is secured to the mounting bracket by means of countersunk screws 63, threaded into embossments 64 on the side wall 19.

The entire light fixture may be upholstered to match the upholstering material of the seat if desired. As indicated in Figs. 1 and 3, the lamp housing 24 and the cover 25 are upholstered with padded upholstery 66, corresponding with that of the backrest 11 and, while the handle 13 is shown as not being upholstered, this part also may be covered to correspond with the remainder of the seat if desired. Likewise the cover plate 65 may be upholstered if desired.

From the foregoing, it will be seen that a seat light fixture has been provided which is retractible from an extended position of use to a closed position flush with the surface contours of the seat and having mechanism adapted to maintain the fixture in either extended or retracted positions and wherein the light is automatically turned on and off by the mere actuation of the fixture from one position to the other with means for carrying away the excess heat generated by the light by means of a ventilating arrangement included in the fixture.

What is claimed is:

1. A light fixture for a vehicle seat comprising a mounting bracket, a lamp housing pivotally mounted in said bracket including a body portion and a removable cover therefor, a lens removably mounted in said cover, a light source mounted in the housing, a switch in the housing connecting said light source with a source of current, said housing being pivotally movable from a retracted position within the mounting bracket to an extended position with said lens outside the bracket, means on the bracket cooperating with said switch automatically to turn the light source on and off as the housing is actuated to extended and retracted positions, mechanism controlling pivotal movement of the housing comprising pivotally connected link members pivotally connected respectively to the housing and said bracket and normally disposed at an angle to each other, means comprising a stop member on the lamp housing for maintaining the relative angularity of the link members in retracted and extended positions of the housing, a spring connected to said link members intermediate their respective connections to the lamp housing and mounting bracket adapted to cause the connected links to exert forces between said bracket and housing to maintain the housing in retracted or extended positions, and a cover plate secured to the mounting bracket concealing said mechanism.

2. A vehicle seat including a seat cushion and a relatively movable backrest, a light fixture for the seat comprising a mounting bracket secured in said backrest adapted to provide a recessed receptacle for a lamp housing pivotally mounted in the bracket and disposed flush with the surface contours of the backrest, said housing including a body portion and a removable cover therefor with a light projecting lens removably mounted in the cover, a light source in the housing, said housing being pivotally movable from a retracted position within the mounting bracket to an extended position with said lens exposed outside the bracket, mechanism controlling pivotal movement of the housing comprising pivotally connected link members pivotally connected respectively to the housing and said bracket and normally disposed at an angle to each other, means on the lamp housing comprising a stop member for maintaining the relative angularity of the link members in retracted and extended positions of the housing, a spring connected to said link members intermediate their respective connections to the lamp housing and mounting bracket adapted to cause the connected links to exert forces between said bracket and housing to maintain the housing in retracted or extended positions, and a cover plate secured to the mounting bracket concealing said mechanism.

3. A vehicle having a seat including a backrest, a light fixture for the vehicle comprising a mounting bracket secured in said backrest adapted to provide a recessed receptacle for a lamp housing pivotally mounted in the bracket and disposed flush with the surface contours of the backrest, said housing including a body portion and a removable cover therefor with a light projecting lens removably mounted in the cover, a light source in the housing, said housing being pivotally movable from a retracted position within the mounting bracket to an extended position with said lens exposed outside the bracket, mechanism controlling pivotal movement of the housing comprising pivotally connected link members pivotally connected respectively to the housing and said bracket and normally disposed at an angle to each other, means comprising a stop member for maintaining the relative angularity of the link members in retracted and extended positions of the lamp housing, and a spring connected to said link members adapted to cause the connected links to exert forces between said bracket and housing to maintain the housing in retracted or extended positions.

4. A vehicle having a seat including a backrest, a light fixture for the vehicle comprising a mounting a bracket secured in said backrest adapted to provide a recessed receptacle for a lamp housing pivotally mounted in the bracket and disposed flush with the surface contours of the backrest, a light projecting lens secured in the housing, a light source in the housing, said housing being pivotally movable from a retracted position within the mounting bracket to an extended position with said lens exposed outside the bracket above the surface of the backrest, mechanism controlling pivotal movement of the housing comprising link members pivotally connected respectively to the housing and said bracket and normally disposed at an angle to each other, means for maintaining the relative angularity of the link members in retracted and extended positions of the lamp housing, and a spring connected to said link members adapted to cause the connected links to exert forces between said bracket and housing to maintain the housing in retracted or extended positions.

5. A vehicle having a seat including a backrest having a recess, a retractible light fixture pivotally mounted in said recess and normally disposed flush with the surface of the backrest, a light projecting lens secured in the fixture, a light source in the fixture, said fixture being movable from a retracted position within the recess to an extended position with said lens exposed above the surface of the backrest, mechanism controlling pivotal movement of the fixture comprising connected link members pivotally connected to the fixture and anchored in said recess and normally disposed at an angle to each other, means for maintaining the relative angularity of the link members in retracted and extended positions of the fixture, and a spring connected to said link members adapted to cause the connected links to exert forces between said fixture and the recess to maintain the housing in retracted or extended positions.

6. A vehicle having a seat including a backrest having a recess, a retractible light fixture pivotally mounted in said recess and normally disposed flush with the surface of the backrest, a light source in the fixture, said fixture being movable from a retracted position within the recess to an extended light projecting position above the surface of the backrest, mechanism limiting pivotal movement of the fixture comprising a pair of folding link members pivotally connected to the fixture and anchored in said recess respectively, and a spring connected to said link members intermediate the connections to said fixture and the recess, said links being disposed at an angle to said spring and in such relation to each other as to maintain the housing in retracted or extended positions under the force exerted by the spring.

7. A vehicle having a seat including a backrest having a recess, a retractible light fixture pivotally mounted in said recess and normally disposed flush with the surface of the backrest, a light source in the fixture, said fixture being movable from a retracted position within the recess to an extended light projecting position above the surface of the backrest, a switch associated with said light source, means for actuating said switch upon movement of the fixture to extended position to turn the light source on and to turn it off upon movement of the fixture to retracted position, mechanism limiting pivotal movement of the fixture comprising a pair of folding link members pivotally connected to the fixture and anchored in said recess respectively, and a spring connected to said link members intermediate the connections to said fixture and the recess, said links being disposed at an angle to said spring and in such relation to each other as to maintain the housing in retracted or extended positions under the force exerted by the spring.

8. A retractible light fixture adapted for flush mounting comprising a recessed mounting bracket and a lamp housing pivotally mounted in the bracket, a light source in the housing, said housing being movable from a retracted position within the recessed bracket to an extended light projecting position outside of the bracket, mechanism limiting pivotal movement of the housing comprising a pair of folding link members pivotally connected to the housing and to the mounting bracket respectively, and a spring connected to said link members intermediate the connections to said housing and bracket, said links being disposed at an angle to said spring and in such relation to each other as to maintain the housing in retracted or extended positions under the force exerted by said spring.

9. A vehicle having a seat including a backrest having a recess, a retractible light fixture pivotally mounted in said recess and normally disposed flush with the surface of the backrest, a light projecting lens secured in the fixture, a light source in the fixture, said fixture being movable from a retracted position within the recess to an extended position with said lens exposed above the surface of the backrest, mechanism controlling pivotal movement of the fixture comprising connected link members pivotally connected to the fixture and anchored in said recess, and a spring connected to said link members intermediate the respective connections to the fixture and in said recess, said link members being disposed at an angle to said spring and in such relation to each other as to maintain the housing in retracted or extended positions under the force exerted by said spring.

10. In a vehicle having a seat including a backrest having a recess, a retractible light fixture pivotally mounted in said recess and normally disposed flush with the surface of the backrest, a light projecting lens secured in the fixture, a light source in the fixture, said fixture being movable from a retracted position within the recess to an extended position with said lens exposed above the surface of the backrest, mechanism controlling pivotal movement of the fixture comprising connected link members pivotally connected to the fixture and anchored in said recess and normally disposed at an angle to each other, means for limiting opening and closing movements of said fixture whereby to maintain the relative angularity of the link members in retracted and extended positions of the fixture, and a spring connected to said link members adapted to cause the connected links to exert forces between said fixture and the recess to maintain the housing in retracted or extended positions.

11. A seat including a backrest, a retractible light fixture pivotally mounted in the backrest and normally disposed flush with the surface thereof, a light projecting lens in the fixture, a source of light in the fixture, said fixture being movable from a retracted position flush with the surface of the backrest to an extended position with said lens exposed above said surface, mechanism controlling pivotal movement of the fixture comprising connected members pivotally connected to the fixture and in the backrest, and a spring connected to said members intermediate the respective connections thereof to the fixture and in the backrest, said members being disposed at an angle to the spring and in such relation to each other as to maintain the fixture either in retracted or extended positions under the force exerted by said spring.

JAMES E. CANDLIN, Jr.
HARRY L. HOWE.

REFERENCES CITED

The following references are of record in the file of this patent:

UNITED STATES PATENTS

| Number | Name | Date |
|---|---|---|
| 1,845,401 | Dietrich | Feb. 16, 1932 |
| 2,244,535 | Grimes | June 3, 1941 |
| 2,312,005 | Smith | Feb. 23, 1943 |
| 2,331,973 | Grose | Oct. 19, 1943 |
| 1,468,727 | Mullard et al. | Sept. 25, 1923 |
| 2,021,836 | Daly | Nov. 19, 1935 |
| 2,084,120 | Ames | June 15, 1937 |

FOREIGN PATENTS

| Number | Country | Date |
|---|---|---|
| 529,118 | France | 1921 |